Sept. 7, 1965  H. C. LAWRENCE ETAL  3,204,911
VIBRATION DAMPING AND LOAD-SUPPORTING APPARATUS
Filed Oct. 25, 1962  2 Sheets-Sheet 1

United States Patent Office 3,204,911
Patented Sept. 7, 1965

3,204,911
VIBRATION DAMPING AND LOAD-SUPPORTING APPARATUS
Harold C. Lawrence, Pequannock, and Louis C. Hoch, Nutley, N.J., and C. L. William Bailes, Astoria, N.Y., assignors to Aeroflex Laboratories Incorporated, a corporation of Delaware
Filed Oct. 25, 1962, Ser. No. 233,056
7 Claims. (Cl. 248—358)

This invention relates to vibration damping and load-supporting apparatus and, while it is of general application, it is particularly useful in supporting, from a vibratory base or platform, very light loads while substantially isolating them from forces of shock and vibration, in any direction, to which the base may be subject.

Heretofore, there have been proposed certain vibration damping and load-supporting apparatus including lengths of stranded wire cable or rope extending between two rectilinear clamping or securing strips, the support being provided by the stiffness of the short lengths of stranded cable. However, in such prior apparatus of this type, the damping of the vibrations has been effected primarily by supplementary elastic material, such as rubber or synthetic plastic material having similar elastic properties. Such prior supporting apparatus have generally been complex, costly, relatively heavy, and have inherently had spring constants unsuitable for very light loads, such as certain precision air craft instruments, and have been incapable of isolation to the degree required to prevent injury to such delicate instruments.

It is an object of the invention, therefore, to provide a new and improved vibration damping and load-supporting apparatus for supporting, from a vibratory base or platform, a lightweight load while substantially isolating it from the forces of shock and vibration to which the base may be subject.

In accordance with the invention, there is provided a vibration damping and load-supporting apparatus for interconnecting a supporting member and a supported member comprising a first frame for connection to one of the members having a plurality of points of attachment in a line, a second frame for connection to the other of the members having a plurality of spaced points of attachment in a line substantially parallel to the line of attachment of the first frame, and a plurality of loops of stranded wire cable, each interconnecting one of the points of attachment of the first frame and a point of attachment of the first frame with a line of support of the second frame and being rigidly secured to the frames and constituting the sole supporting means for the supported member. The term "loop" is used herein and in the appended claims to refer either to a continuous closed single loop, a continuous series of helical loops, or an open semi-loop anchored at each end, in each instance the term "loop" applying only to the active length of cable between points of attachment.

For a better understanding of the present invention, together with other and further objects thereof, reference is had to the following description, taken in connection with the accompanying drawings, while its scope will be pointed out in the appended claims.

Referring now to the drawings:

FIG. 8 is a view in elevation showing deflection of the apparatus of FIG. 6 in response to a downward force, while

Figure 1:
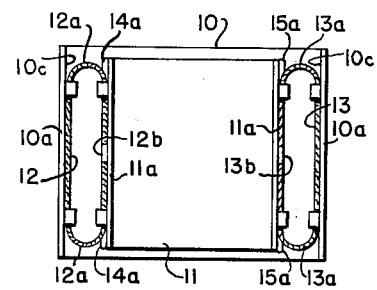
FIG. 1 is a plan view of a vibration damping and load-supporting apparatus embodying the invention.
Figure 2:
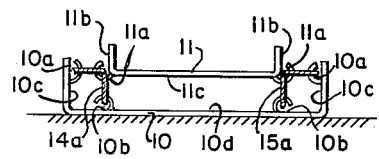
FIG. 2 is a view in elevation of the apparatus of FIG. 1.

Referring now to FIGS. 1 and 2 of the drawings, there is illustrated vibration damping and load-supporting apparatus for interconnecting a supporting member, such as the frame of an aircraft (not shown), and a supported member, such as a precision instrument (not shown), comprising a first frame 10 for connection to the supporting member, that is, specifically the frame of the aircraft, having a plurality of spaced points of attachment lying in parallel lines, for example the lines 10a, 10a (FIG. 1) and 10b, 10b (FIG. 2). The lines of attachment 10a, 10a lie in supporting faces 10c, 10c while the lines of attachment 10b, 10b lie in a supporting face 10d. It is seen that the faces 10c, 10c and the face 10d lie in two different planes, specifically substantially mutually perpendicular planes.

The apparatus of FIGS. 1 and 2 further comprises a second frame 11 for connection to the supported member or precision instrument (not shown) having a plurality of spaced points of attachment lying in parallel lines, specifically the lines 11a, 11a, substantially parallel to the lines of attachment 10a, 10a and 10b, 10b of the frame 10. The lines of attachment 11a, 11a are located at the corner of the frame 11 having upstanding sides or faces 11b, 11b so that they effectively lie in the planes of the faces 11b, 11b as well as in the lower face 11c, the faces 11b, 11b and 11c being substantially parallel to the faces 10c, 10c and 10d, respectively.

The apparatus of FIGS. 1 and 2 further comprises a plurality of normally substantially semicircular loops of stranded wire cable, each interconnecting one of the lines of attachment of the supporting frame 10 and the corresponding line of attachment of the supported frame 11. The term normal, as applied to the semicircular loops, is used to denote such a configuration in the absence of vibration or shock forces. Specifically, the loops 12a, 12a interconnect the lefthand lines of attachment 10a, 11a, the loops 13a, 13a interconnect the righthand lines of attachment 10a, 11a, while the loops 14a, 14a and 15a, 15a interconnect the lines of attachment 11a, 10b. Each of the loops 12a, 13a, 14a, and 15a, as shown, comprises portions of a complete closed turn of stranded wire cable 12, 13, 14, and 15 (only the end portions 14a and 15a of the latter being shown in the drawings) which are closed by butt welds such as the welds 12b and 13b of turns 12 and 13, respectively. Alternatively, only the semicircular portions of these closed turns may be used, the remaining portions being omitted. In either case, however, the loops are clipped, staked, or otherwise rigidly anchored to the frames 10 and 11 adjacent their semicircular portions and the loops are formed with a radius of curvature at their points of connection to the frames resulting in a predetermined prestressing of the cable, this prestressing principally determining the stiffness and, thereby, the isolating characteristic of the support.

Figure 3:
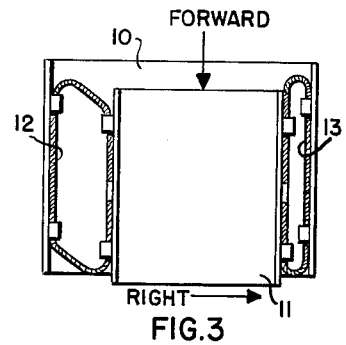
FIG. 3 is a plan view of the apparatus of FIG. 1 showing deflection or temporary deformation in response to forward and rightward forces.
Figure 4:
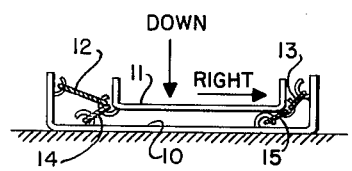
FIG. 4 is a view in elevation of the apparatus of FIG. 1 deflected or temporarily deformed in response to downward and rightward forces.

In FIG. 3, there is shown the manner in which the supporting loops are deflected in response to forward and rightward shock or vibration forces while in FIG. 4 there is shown how the loops are deflected in response to downward and rightward forces. Obviously, the arrangement is symmetrical, so that forces acting in the opposite directions produce equal and opposite deflections of the supporting loops.

As illustrated, two pairs of opposed loops 12a, 12a and 13a, 13a are provided for absorbing transverse shock and vibration forces while pairs of similarly disposed loops 14a, 14a and 15a, 15a are provided primarily for absorbing vertical shock and vibration forces. It will be understood however, that, if desired, a larger number of supporting cable loops may be provided, depending to a large extent upon the dimension of the supported member 11 transverse to the normal planes of the loops. Moreover, it will be understood that, in the embodiment illustrated, the supporting loops are provided in only two planes, which might be termed the X and Y planes. In certain instances, it may be desirable also to have loops absorbing vibration and shock forces in the third dimension or Z plane.

Figure 5:
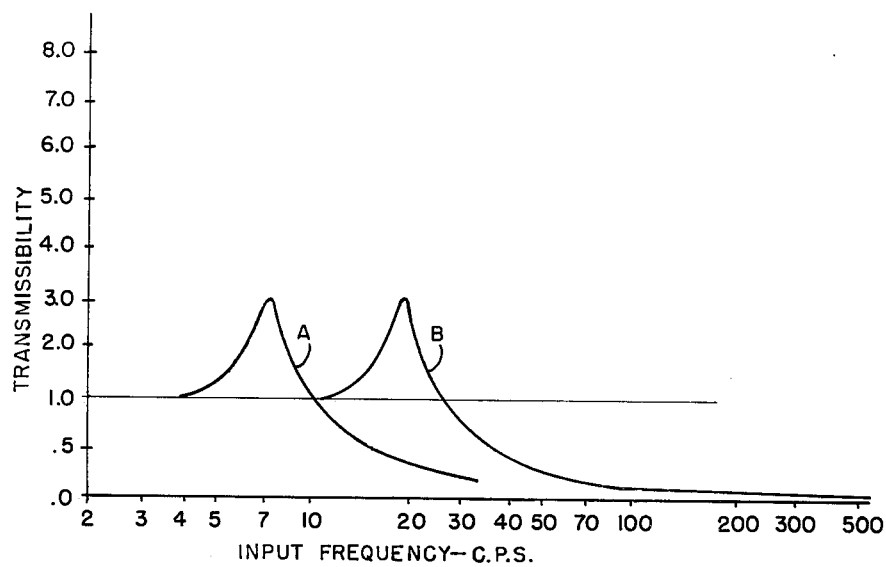
FIG. 5 is a graph illustrating the frequency-transmissibility characteristic of the apparatus of FIG. 1.

In FIG. 5, there are represented the frequency-transmissibility characteristics of typical apparatus of the types shown in FIGS. 1 and 2, curve A representing the characteristic for vibration forces in the Z direction and curve B representing the characteristics in the X and Y directions. The damping represented by curves A and B results solely from interstrand friction of the wire cable loops upon deflection and does not require the addition of any other resilient damping material such as heretofore used in such vibration damping apparatus. It will be noted that the highest natural resonant frequency, in the X and Y directions, is just under 20 cycles per second. It will also be noted that the apparatus has a transmissibility of unity at approximately 25 cycles per second. Thus, the apparatus will effectively isolate the supported member 11 for all shock and vibration frequencies substantially above 25 cycles per second. Other apparatus of the type shown in FIGS. 1 and 2 have been designed to have with their supported load natural resonant frequencies as low as 5 cps. and as high as 30 cps., indicating the wide range of natural frequencies attainable, depending upon the application.

It is noted that the support of the frame 11 is universal, due to flexing of the supporting loops in all directions.

An important advantage of the supporting apparatus described is that they perform their load-supporting and vibration damping functions regardless of attitude or orientation, that is, the supported mass may be inverted vertically or tilted to any intermediate position without affecting the performance of the supporting apparatus. Many currently available vibration isolators are effective only when maintained in a fixed plane and lose their isolating capability when inverted or turned on their side, due to the phenomenon normally described as bottoming out against the isolator structure itself.

The apparatus described above are particularly suitable for light loads in which localized nonuniform stressing is not significant. As stated above, in case it is desired to avoid such localized nonuniform stressing, multiple supporting loops in parallel planes may be provided.

Figure 6:
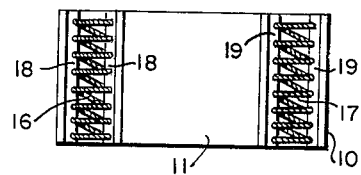
FIG. 6 is a plan view of a modified form of vibration damping and load-supporting apparatus embodying the invention.

In FIG. 6, there is illustrated an alternative arrangement for supporting the frame 11 from the frame 10 in which the multiple half-loops are replaced by assemblies comprising continuous helical loops 16 and 17 secured to elongated strips 18, 18 and 19, 19, respectively, in turn secured to opposed vertical faces of the frames 10 and 11. In this instance, each of the turns of the helixes 16 and 17 is firmly staked, clipped, or anchored to its respective strips, forming unitary assemblies which may be readily assembled to, and disassembled from, the frames 10 and 11, thus permitting a wide range of orientations.

Figure 7:
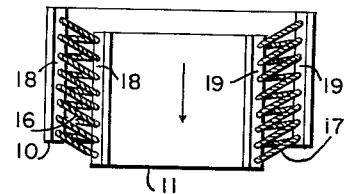
FIG. 7 is a plan view showing deflection of the apparatus of FIG. 6 in response to a forward force.
Figure 8:
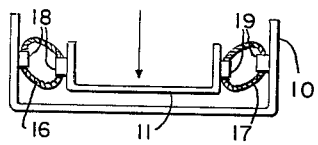
Figure 9:
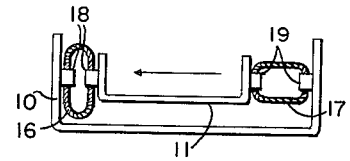
FIG. 9 is a view in elevation showing deflection of the apparatus in response to a leftward force.

FIG. 7 is a plan view of the apparatus of FIG. 6 showing the deflection of the helical loops in response to a forward force. FIG. 8 is an end view of the apparatus of FIG. 6 showing deflection of the helical loops in response to a downward force, while FIG. 9 is an end view of the apparatus of FIG. 6 showing deflection of the loops 16 and 17 in response to a leftward force. It will be clear that in the apparatus of FIG. 6 also, the frame 11 is universally supported, the loops 16 and 17 providing resilient restraining and restoring forces in all three directions.

While there have been described what are, at present, considered to be the preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A vibration damping and load-supporting apparatus for interconnecting a supporting member and a supported member comprising:
    (a) a first frame for connection to one of said members having a plurality of spaced points of attachment in a line;
    (b) a second frame for connection to the other of said members having a plurality of spaced points of attachment in a line substantially parallel to the line of attachment of said first frame;
    (c) and a plurality of loops of stranded wire cable, each interconnecting one of said points of attachment of said first frame and a point of attachment of said second frame and being rigidly secured to said frames and constituting the sole supporting means for said supported member.

2. A vibration damping and load-supporting apparatus for interconnecting a supporting member and a supported member comprising:
    (a) a first frame for connection to one of said members having supporting faces lying in each of a plurality of planes;
    (b) a second frame for connection to the other of said members having supporting faces lying in each of a plurality of planes respectively substantially parallel to those of said first frame;
    (c) and a plurality of loops of stranded wire cable, each interconnecting one of the supporting faces of said first frame with a parallel supporting face of said second frame and being rigidly secured to said frames and constituting the sole supporting means for said supported member.

3. A vibration damping and load-supporting apparatus for interconnecting a supporting member and a supported member comprising:
    (a) a first frame for connection to one of said members having supporting faces lying in each of two substantially mutually perpendicular planes;
    (b) a second frame for connection to the other of said members having supporting faces lying in each of two planes respectively substantially parallel to those of said first frame;
    (c) and a plurality of loops of stranded wire cable, each interconnecting one of the supporting faces of said first frame with a parallel supporting face of said second frame and being rigidly secured to said frames and constituting the sole supporting means for said supported member.

4. A vibration damping and load-supporting apparatus for interconnecting a supporting member and a supported member comprising:
    (a) a first frame for connection to one of said members having two opposed substantially parallel supporting faces;
    (b) a second frame for connection to the other of said members having two supporting faces substantially parallel to those of said first frame;
    (c) and two groups of loops of stranded wire cable, each group interconnecting one of the supporting faces of said first frame with a supporting face of said second frame and being rigidly secured to said frames and constituting the sole supporting means for said supported member.

5. A vibration damping and load-supporting apparatus for interconnecting a supporting member and a supported member comprising:
(a) a first frame for connection to one of said members having two opposed substantially parallel supporting faces;
(b) a second frame for connection to the other of said members having two supporting faces substantially parallel to those of said first frame;
(c) and two continuous helixes of stranded wire cable, each interconnecting a different one of the supporting faces of said first frame with a different supporting face of said second frame and being rigidly secured to said frames and constituting the sole supporting means for said supported member.

6. A vibration damping and load-supporting apparatus for interconnecting a supporting member and a supported member comprising:
(a) a first frame for connection to one of said members having a plurality of spaced points of attachment in a line;
(b) a second frame for connection to the other of said members having a plurality of spaced points of attachment in a line substantially parallel to the line of attachment of said first frame;
(c) and a plurality of normally substantially semicircular loops of stranded wire cable, each having an active portion of substantially semicircular configuration and each interconnecting one of said points of attachment of said first frame and a point of attachment of said second frame and being rigidly secured to said frames and constituting the sole supporting means for said supported member.

7. A vibration damping and load-supporting apparatus for interconnecting a supporting member and a supported member comprising:
(a) a first frame for connection to one of said members having a plurality of spaced points of attachment in a line;
(b) a second frame for connection to the other of said members having a plurality of spaced points of attachment in a line substantially parallel to the line of attachment of said first frame;
(c) and a plurality of loops of stranded wire cable, each interconnecting one of said points of attachment of said first frame and a point of attachment of said second frame, each of said cable loops having a radius of curvature at its points of connection to said frames resulting in a predetermined prestressing of the cable, thereby to determine the stiffness of the support and being rigidly secured to said frames and constituting the sole supporting means for said supported member.

References Cited by the Examiner
UNITED STATES PATENTS

| | | | |
|---|---|---|---|
| 1,671,764 | 5/28 | Dickey | 267—63 |
| 2,912,212 | 11/59 | Lowe | 248—358 |
| 3,023,993 | 3/62 | Kerley | 248—358 |

CLAUDE A. LE ROY, *Primary Examiner.*

FRANK L. ABBOTT, *Examiner.*